(12) United States Patent
Min et al.

(10) Patent No.: US 10,304,008 B2
(45) Date of Patent: May 28, 2019

(54) FAST DISTRIBUTED NONNEGATIVE MATRIX FACTORIZATION AND COMPLETION FOR BIG DATA ANALYTICS

(71) Applicant: NEC Laboratories America, Inc., Princeton, NJ (US)

(72) Inventors: Renqiang Min, Princeton, NJ (US); Dongjin Song, San Diego, CA (US)

(73) Assignee: NEC Corporation, Tokyo (JP)

( * ) Notice: Subject to any disclaimer, the term of this patent is extended or adjusted under 35 U.S.C. 154(b) by 601 days.

(21) Appl. No.: 15/063,236

(22) Filed: Mar. 7, 2016

(65) Prior Publication Data

US 2016/0275416 A1 Sep. 22, 2016

Related U.S. Application Data

(60) Provisional application No. 62/135,751, filed on Mar. 20, 2015.

(51) Int. Cl.
 G05B 13/04 (2006.01)
 G06F 17/16 (2006.01)
 G06N 20/00 (2019.01)

(52) U.S. Cl.
 CPC ......... G06N 20/00 (2019.01); G05B 13/04 (2013.01); G06F 17/16 (2013.01)

(58) Field of Classification Search
 None
 See application file for complete search history.

(56) References Cited

U.S. PATENT DOCUMENTS

| | | | | |
|---|---|---|---|---|
| 5,422,836 A | * | 6/1995 | Beichter | G06F 17/16 708/520 |
| 8,452,718 B2 | * | 5/2013 | Jin | G06N 99/005 706/12 |
| 2008/0275862 A1 | * | 11/2008 | Liu | G06F 17/3071 |

OTHER PUBLICATIONS

Sun et al. Alternating Direction Method of Multipliers for Non-Negative Matrix Factorization With the Beta-Divergence. 2014 IEEE International Conference on Acoustic, Speech and Signal Processing (ICASSP) (Year: 2014).*

Moghaddam et al. Spectral Bounds for Sparse PCA: Exact and Greedy Algorithms. Advances in Neural Information Processing Systems. Jan. 2005. (Year: 2005).*

* cited by examiner

*Primary Examiner* — Alexey Shmatov
*Assistant Examiner* — Robert Bejcek, II
(74) *Attorney, Agent, or Firm* — Joseph Kolodka

(57) ABSTRACT

Systems and methods are disclosed for operating a machine, by receiving training data from one or more sensors; training a machine learning module with the training data by: partitioning a data matrix into smaller submatrices to process in parallel and optimized for each processing node; for each submatrix, performing a greedy search for rank-one solutions; using alternating direction method of multipliers (ADMM) to ensure consistency over different data blocks; and controlling one or more actuators using live data and the learned module during operation.

17 Claims, 3 Drawing Sheets

FAST DISTRIBUTED NONNEGATIVE MATRIX FACTORIZATION AND COMPLETION FOR BIG DATA ANALYTICS

The present application claims priority to Provisional Application 62/135,751 filed Mar. 20, 2015, the content of which is incorporated by reference.

BACKGROUND

The present system is related to learning systems and big data analytic engines.

Nonnegative matrix factorization and completion (NMFC), which aims to approximate a (partially) observed data matrix with two nonnegative low rank matrix factors, has been successfully applied in a wide range of machine learning applications, such as dimensionality reduction, collaborative filtering, compressed sensing. Nevertheless, due to the non-convex formulation and the underlying inverse problem, many existing solutions are not accurate and not scalable to handle large problems.

SUMMARY

In one aspect, systems and methods are disclosed for operating a machine, by receiving training data from one or more sensors; training a machine learning module with the training data by: partitioning a data matrix into smaller submatrices to process in parallel and optimized for each processing node; for each submatrix, performing a greedy search for rank-one solutions; using alternating direction method of multipliers (ADMM) to ensure consistency over different data blocks; and controlling one or more actuators using live data and the learned module during operation.

In another aspect, an efficient greedy and distributed process for nonnegative matrix factorization and completion (GD-NMFC) is disclosed. The system first partitions a large-scale data matrix into smaller submatrices in appropriate manners (e.g., random, rank-one SVD, and rank-one ADMM). Next, for each submatrix, the system searches for rank-one solutions of NMFC based upon ADMM in a greedy manner and concatenate them to form the low rank matrix factors. Finally, the solutions of each subproblem are concatenated to form the final solution and we show both the convergence of the algorithm and its error bound.

Advantages of the system may include one or more of the following. The matrix inverse problem is eliminated and the engine load is only linearly proportional to the matrix ranker, and the system is much faster than other methods for NMFC. The system can use a warm start technique for dividing large-scale datasets and perform distributed optimization in parallel. Therefore, it is scalable for big data analytics.

DESCRIPTION

An efficient greedy and distributed engine for nonnegative matrix factorization and completion (GD-NMFC) is detailed.

Figure 1:
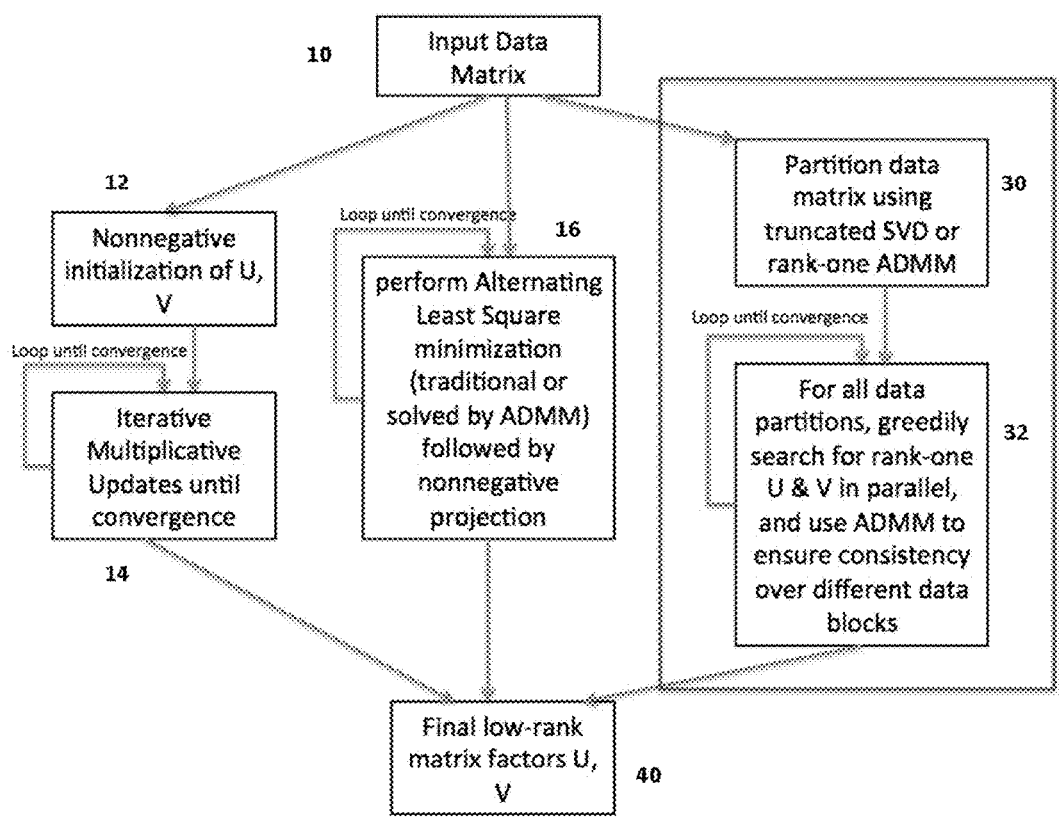
FIG. 1 shows an efficient greedy and distributed engine for nonnegative matrix factorization and completion (GD-NMFC).

In FIG. 1, an input data matrix is received (10). A non-negative initialization of matrices U and V is done (12). The process performs iterative multiplicative updates until convergence is achieved (14). Alternatively, from 10, the process performs least square minimization followed by a non-negative projection (16). In another alternative from 10, the process partitions the data matrix using truncated SVD or rank-one ADMM (30). Next, for all data partitions, the process greedily searches for rank-one U&V in parallel, and uses ADMM to ensure consistency over different data blocks (32) and then loops until convergence is achieved. From 14, 16, or 32, the process selects the final low-rank matrix factors U& V as the result (40).

Nonnegative matrix factorization and completion (NMFC) has been used to address scalability issues in machine learning by looking for two nonnegative low rank matrix factors, $U \in R^{n \times r}$ and $V \in R^{r \times d}$ to recover a partially (fully) observed data matrix $X \in R^{n \times d}$ of n samples and d features, i.e., $$\min_{U,V} \frac{1}{2} \|P_\Omega(X - UV)\|_F^2 \qquad (1)$$

$$\text{s.t.} \quad U \geq 0, V \geq 0$$

where r denotes rank, $\|\cdot\|_F$ is the Frobenius norm, the inequalities are element-wise, and $P_\Omega$ is a projection operator such that the (i, j)-th entry of $P_\Omega(X)$ is $X_{i,j}$ if $(i,j) \in \Omega$ and zero otherwise.

GD-NMFC partitions a large-scale data matrix into smaller submatrices with appropriate techniques (e.g., random, rank-one SVD, and rank-one ADMM) such that each submatrix is parallelly optimized over a single node. Then, for each submatrix, we conduct greedy search for rank-one solutions based upon ADMM. The matrix inverse problem is eliminated and the optimization of NMFC can be dramatically accelerated, especially when r is large.

GD-NMFC avoids the possible failures caused by biased rank estimation and is SVD-free since it relies on optimizing over U and V, iteratively. Meanwhile, greedy searching for the optimal directions based upon rank-one approximation from 1 to r is more efficient than updating r directions in all iterates. In addition, the lower rank solution before each rank increment can be seen as a "warm start" of the next higher rank minimization and thus speed up convergence.

Our empirical studies over several real-world large scale datasets verify that GD-NMFC is more efficient than state-of-the-art methods while achieving similar or better performance.

Given a matrix $X \in R^{n \times d}$ of n rows and d columns, we use $x_j \in R^n$ to denote its j-th column, use $x^i \in R^{1 \times d}$ to denote its i-th row, and use $X_{ij}$ to denote the entry in i-th row and j-th column of X. The Frobenius norm of X is defined as $\|X\|_F = \sqrt{Tr(X^T X)}$ where $Tr(\cdot)$ denote the trace of a square matrix. $P_\Omega$ is a projection operator such that the (i, j)-th entry of $P_\Omega(X)$ is $X_{i,j}$ if $(i,j) \in \Omega$ and zero otherwise. The inner product of two matrices X and Y is defined as $<X,Y> = Tr(X^T Y)$.

NMF aims to reconstruct a fully observed data matrix with two nonnegative low rank matrix factors and has been widely applied for face recognition, object classification, and clustering. To optimize NMF, multiplicative update rule (MUR) can be used. MUR is the most popular method for NMF and it can be derived based upon Karush-Kuhn-Tucker (KKT) optimality condition, i.e., $$U_{ik} \leftarrow U_{ik} \frac{(XV^T)_{ik}}{(UVV^T)_{ik}} \quad (2)$$

and $$V_{kj} \leftarrow V_{kj} \frac{(U^TX)_{kj}}{(U^TUV)_{kj}}. \quad (3)$$

With nonnegative initializations of U and V, both U and V will remain nonnegative in each iteration. Since MUR converges slowly in many practical applications, ALS and projected gradient method can be utilized as the substitutions. ALS minimizes the least square cost function $\|X-UV\|_F^2$ with respect to U and V, iteratively. The procedure is based upon two closed form solutions, iteratively, i.e., $$U = P_+(XV^T(VV^T)^*) \quad (4)$$

and $$V = P_+((U^TU)^* U^TX), \quad (5)$$

where * denotes pseudo-inverse and $P_+$ projects the matrix onto a nonnegative set, i.e., $P_+(U)=\max(U,0)$. Instead of calculating pseudo-inverse in ALS, projected gradient method first derive the gradient of $PX-UVP_F^2$ with respect to U (or V) and then update U (or V) based upon projected gradient update. Fast HALS [9] is a coordinate descent approach which optimize the i-th row of U and i-th column of V when i iterates from 1 to r until convergence is achieved.

An alternative to ALS is called alternating direction method of multiplier (ADMM). ADMM introduces two auxiliary variables A and B and considers the following optimization problem:

$$\min_{U,V,A,B} \frac{1}{2}\|X - UV\|_F^2 \quad (6)$$

s.t. $U - A = 0, V - B = 0, A \geq 0, B \geq 0.$

To solve this problem, the augmented Lagrangian function of 6 can be derived as:

$$L(U, V, A, B, \Lambda, \Pi) = \quad (7)$$
$$\frac{1}{2}\|X - UV\|_F^2 + \langle\Lambda, U - A\rangle + \langle\Pi, V - B\rangle + \frac{\rho}{2}\|U - A\|_F^2 + \frac{\rho}{2}\|V - B\|_F^2$$

where $\Lambda \in \mathbb{R}^{n \times r}$ and $\Pi \in \mathbb{R}^{r \times d}$ are Lagrange multipliers, $\langle \cdot \rangle$ is the matrix inner product, and $\rho > 0$ is the penalty parameter for the constraints. By minimizing L with respect to U, V, A, B, $\Lambda$, and $\Pi$, we can update each parameter iteratively until convergence.

Since ADMM involves matrix inverse problems which are computationally expensive when the matrix rank r is relatively large, it may not be scalable to large scale matrices as they are more likely to contain a large r. Therefore, an efficient greedy and distributed algorithm for nonnegative matrix factorization and completion (GD-NMFC) is developed.

Matrix completion aims to recover the whole data matrix X from partially observed entries or undersampled linear measurements by leveraging the interaction between different instances which can be well captured with low-rank structure. In the past few years, matrix completion has been applied various applications, such as collaborative filtering in recommender system and link recommendation in social network analysis.

Since it is intractable to minimize the matrix rank exactly in general case, the trace norm or nuclear norm is widely utilized as a convex surrogate of rank. Nevertheless, it is computationally expensive to solve the standard low rank or trace norm problem as it involves computing SVD. In recent years, many approaches have been developed to tackle this problem. Most of these methods, however, still involve the computation of SVD or truncated SVD in each iteration and thus cannot be scalable to large-scale problems. Several methods approximate the trace norm with UV and proceed by alternatively optimizing U and V. It has been shown that linear convergence rate can be established theoretically with properly designed optimization procedure and appropriate initialization (Jain et. al. 2013). The computational complexity of these approaches, however, is quadratically proportional to the rank of the estimated matrix and thus cannot be scalable for large matrices.

We sequentially detail greedy distributed NMFC with three steps. We first describe how to partition a large data matrix X into smaller submatrices. Next, we introduce rank-one ADMM for NMFC based upon a submatrix. Finally, we show how to aggregate the solutions of all submatrices.

Data Partition

When the number of samples n is extremely large in a data matrix X, solving NMFC over a single node will be infeasible. In this case, we can partition X into smaller submatrices, i.e., $X=[X(1)\in\mathbb{R}^{r_1 \times d}; X(2)\in\mathbb{R}^{r_2 \times d}; \ldots ; X(C)\in\mathbb{R}^{r_c \times d}]$ where $\Sigma_i r_i = r$ such that each one of them can be optimized parallelly.

In practical applications, three different partition methods could be utilized:

- uniformly sample a number of samples (i.e., $r_i$) from X for the i-th node;
- first perform truncated SVD by setting r=1, project its eigenvector over nonnegative set, and then conduct k-means clustering over the eigenvector;
- first perform ADMM for NMFC by setting r=1 and then conduct k-means clustering over the eigenvector.

The second and third ways of partition can be seen as a "warm start" for the the second rank optimization and are expected to speed up convergence.

Rank-One ADMM for NMFC

Given each submatrix X(i) where i is the index of submatrices, rank-one ADMM can be used to optimize NMFC over this node. In rank-one ADMM, we greedy search for rank-one solutions based upon ADMM. In this way, the matrix inverse problem is eliminated and the optimization of NMFC can be dramatically accelerated, especially when r is large.

In the first step (k=1) of rank-one ADMM, we set $\hat{X}(i) = X(i)$. For k≥2, we set $\hat{X}(i)=\hat{X}((i)-u(i)_{k-1}^T v(i)^{k-1}$. Therefore, rank-one ADMM for the k-th rank can be formulated as:

$$\min_{u(i)_k, v(i)^k, a(i)_k, b(i)^k} \frac{1}{2} \left\| \hat{X}(i) - u(i)_k v(i)^k \right\|_F^2 \quad (8)$$

$$\text{s.t.} \quad u(i)_k - a(i)_k = 0, \, v(i)^k - b(i)^k = 0,$$

$$a(i)_k \geq 0, \, b(i)^k \geq 0,$$

$$v(i)^k - v(j)^k = 0, \, \forall \, j \neq i,$$

where the first three constraints are over this node and the last constraint is the communication between different nodes used to ensure that $v(i)^k$ on each node is consistent.

The augmented Lagrangian of Eq. 8 can be written as:

$$L(u(i)_k, v(i)^k, a(i)_k, b(i)^k, p, q, s) = \quad (9)$$

$$\frac{1}{2} \left\| \hat{X}(i) - u(i)_k v(i)^k \right\|_F^2 + \langle p, u(i)_k - a(i)_k \rangle +$$

$$\langle q, v(i)^k - b(i)^k \rangle + \sum_{j \neq i} \langle s, v(i)^k - v(j)^k \rangle \frac{\rho}{2} \| u(i)_k - a(i)_k \|_2^2 +$$

$$\frac{\rho}{2} \| v(i)^k - b(i)^k \|_2^2 + \sum_{j \neq i} \frac{\rho}{2} \| v(i)^k - v(j)^k \|_2^2.$$

where $\rho \in \mathbb{R}^n$, $q \in \mathbb{R}^{l \times d}$, and $t \in \mathbb{R}^{r \times d}$ are Lagrangian multipliers, and $\rho > 0$ is the penalty parameter for the constraints. By minimizing L with respect to $u(i)_k$, $v(i)^k$, $a(i)_k$, $b(i)^k$, p, q, and s, iteratively, we can obtain the closed form solution of each parameter as follows:

$$\begin{cases}
u(i)_k \leftarrow \dfrac{\left[\hat{X}(i)(v(i)^k)^T + \rho a(i)_k - p\right]}{[v(i)^k(v(i)^k)^T + \rho]} \\
v(i)^k \leftarrow \dfrac{\left[u(i)_k^T \hat{X}(i) + \rho b(i)^k + \sum_{j \neq i} \rho v(j)^k - q - (c-1)s\right]}{[(u(i)_k)^T u(i)_k + \rho]} \\
a(i)_k \leftarrow P_+(u(i)_k + p/\rho) \\
b(i)^k \leftarrow P_+(v(i)^k + q/\rho) \\
p \leftarrow p + \rho(u(i)_k - a(i)_k) \\
q \leftarrow q + \rho(v(i)^k - b(i)^k) \\
s \leftarrow s + \dfrac{\rho}{c-1} \sum_{j \neq i} (v(i)^k - v(j)^k)
\end{cases} \quad (10)$$

In one embodiment, Technique 1 is executed by the processor 104 of FIG. 2 as follows:

Technique 1 Greedy Distributed NMFC

Input: $X \in \mathbb{R}^{n \times d}$, $u(i)_k$, $v(i)^k$, $a(i)_k$, $b(i)^k$, p, q, s, ρ
Output: U and V
1:     Partition X into submatrices, i.e. X =
    [X (1) $\in \mathbb{R}^{r1 \times d}$; X(2) $\in \mathbb{R}^{r2 \times d}$; . . . ; X(c) $\in \mathbb{R}^{rc \times d}$]
2:     For i-th node
3:       For k = 1 to r,
4:         Repeat:
5:           Update $u(i)_k$ based upon Eq. 10;
6:           Update $v(i)^k$ based upon Eq. 10;
7:           Update $a(i)_k$ based upon Eq. 10;
8:           Update $b(i)^k$ based upon Eq. 10;
9:           Update p based upon Eq. 10;
10:          Update q based upon Eq. 10;
11:          k = k + 1
12:        Until convergence.
13:       U(i) = [U(i); $u(i)_k$], V(i) = [V(i), $v(i)^k$],
A(i) = [A(i); $a(i)_k$], B(i) = [B(i), $b(i)^k$].
14:       End for.
15:     End for i-th node.
16:     U = [U; U(i)], V = V(i), S = [S; S(i)], T = T(i)

Figure 2:
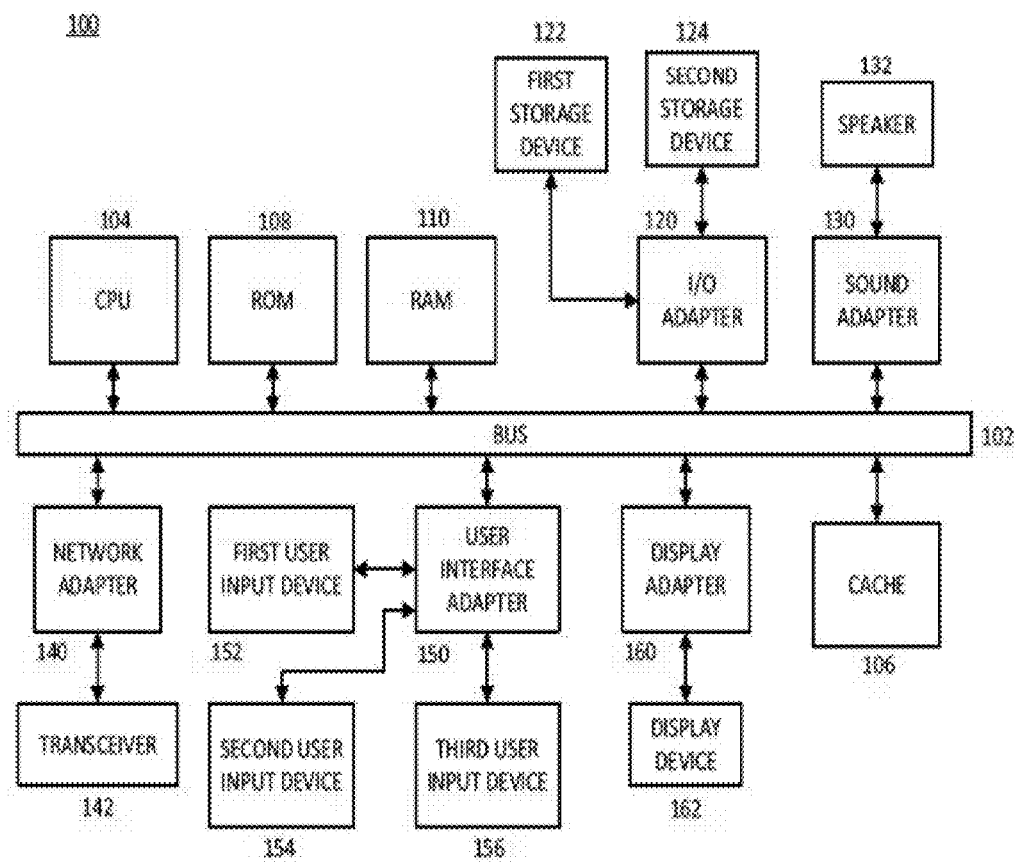
FIG. 2 shows an exemplary processing system to which the present principles may be applied, in accordance with an embodiment of the present principles.

In another embodiment, Technique 2 is executed by the processor 104 of FIG. 2. In Technique 2, U and V are randomly initialized and the matrices are set to zero matrices of appropriate sizes. The stopping criterion for ADMM is met if the objective in Eq. 6 does not improve relative to a tolerance value. In each step, the main computation are U(k+1) updating and V(k+1) updating.

Technique 2 ADMM for NMF

1:  Input: $X \in \mathbb{R}^{n \times d}$, $U \in \mathbb{R}^{n \times r}$, $V \in \mathbb{R}^{r \times d}$, $S \in \mathbb{R}^{n \times r}$, $T \in \mathbb{R}^{r \times d}$, ρ
2:  Output: U and V
3:  Set k = 0 (index of iteration)
4:  Repeat:
5:     U (k + 1) = (XV(k)$^T$ + ρS(k) − Λ(k)) (V(k)V(k)$^T$ + ρI)$^{-1}$
6:     V(k + 1) = (U(k + 1)$^T$ U(k + 1) + ρI)$^{-1}$ (U(k + 1)$^T$ X + ρT(k) − Π(k))
7:     S(k + 1) = $P_+$ (U(k + 1) + Λ(k)/ρ)
8:     T(k + 1) = $P_+$ (V(k + 1) + Π(k)/ρ)
9:     Λ(k + 1) = Λ(k) + ρ(U(k + 1) − S(k + 1))
10:   Π(k + 1) = Π(k) + ρ(V(k + 1) − T(k + 1))
11:   k = k + 1.
12: Until convergence.

The foregoing details a rank-one alternating direction method of multiplier (ADMM) for nonnegative matrix factorization (NMF). In each step, rank-one ADMM seeks for a rank-one solution of NMF based upon ADMM and utilizes greedy search to obtain low rank matrix factors. In this way, rank-one ADMM avoids the underlying matrix inverse problem and the computation is only linearly proportional to the rank r. Thorough empirical studies over several real-world large scale datasets demonstrate that the present system improves computer performance and is more efficient than conventional systems while achieving similar or better learning performance.

We conducted empirical studies based upon two publicly available datasets, i.e., UMIST and Coil20. Our results demonstrated that rank-one ADMM is more efficient and effective than MUR, ALS, and traditional ADMM.

FIG. 2 with an exemplary processing system 100, to which the present principles may be applied, is illustratively depicted in accordance with an embodiment of the present principles, for operating a machine, by receiving training data from one or more sensors; training a machine learning module with the training data by: partitioning a data matrix into smaller submatrices to process in parallel and optimized for each processing node; for each submatrix, performing a greedy search for rank-one solutions; using alternating direction method of multipliers (ADMM) to ensure consistency over different data blocks; and controlling one or more actuators using live data and the learned module during operation.

The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 3:
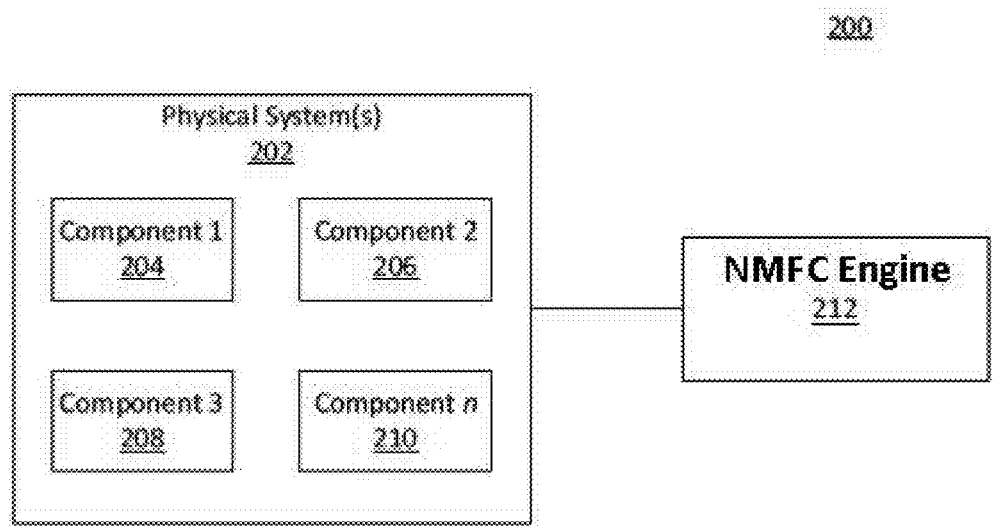
FIG. 3 shows a high level diagram of an exemplary physical system including an aging profiling engine, in accordance with an embodiment of the present principles.

Referring now to FIG. 3, a high level schematic 200 of an exemplary physical system including an NMFC engine 212 is illustratively depicted in accordance with an embodiment of the present principles. In one embodiment, one or more components of physical systems 202 may be controlled and/or monitored using an engine 212 according to the present principles. The physical systems may include a plurality of components 204, 206, 208. 210 (e.g., Components 1, 2, 3, . . . n), for performing various system processes, although the components may also include data regarding, for example, financial transactions and the like according to various embodiments.

In one embodiment, components 204, 206, 208, and 210 may include any components now known or known in the future for performing operations in physical (or virtual) systems (e.g., temperature sensors, deposition devices, key performance indicator (KPI), pH sensors, financial data, etc.), and data collected from various components (or received (e.g., as time series)) may be employed as input to the engine 212 according to the present principles. The engine/controller 212 may be directly connected to the physical system or may be employed to remotely monitor and/or control the quality and/or components of the system according to various embodiments of the present principles.

While the machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims.

What is claimed is:

1. A method for operating a machine, comprising:
receiving training data from one or more sensors;
training a machine learning module with the training data by:
partitioning a large-scale data matrix with a first rank into smaller submatrices;
for each submatrix, greedily searching for rank-one solutions of Nonnegative matrix factorization/completion (NMFC) based upon alternating direction method of multipliers (ADMM);
concatenating the sub-matrices to form low rank matrix factors, wherein the low rank is less than the first rank;
determining solutions of each submatrix and concatenating to form a final solution;
determining:

$$\begin{cases} u(i)_k \leftarrow \dfrac{\left[\hat{X}(i)(v(i)^k)^T + \rho a(i)_k - p\right]}{[v(i)^k(v(i)^k)^T + \rho]} \\ v(i)^k \leftarrow \dfrac{\left[u(i)_k^T \hat{X}(i) + \rho b(i)^k + \sum_{j \neq i} \rho v(j)^k - q - (c-1)s\right]}{[(u(i)_k)^T u(i)_k + \rho]} \\ a(i)_k \leftarrow P_+(u(i)_k + p/\rho) \\ b(i)^k \leftarrow P_+(v(i)^k + q/\rho) \\ p \leftarrow p + \rho(u(i)_k - a(i)_k) \\ q \leftarrow q + \rho(v(i)^k - b(i)^k) \\ s \leftarrow s + \dfrac{\rho}{c-1} \sum_{j \neq i} (v(i)^k - v(j)^k) \end{cases}$$

where X is a partially observed data matrix of n samples and d features; i, j, k are indices, a and b are auxiliary variables, c is a constant, p, q, and T are Lagrangian multipliers, $\rho$ is a penalty operator, and U and V are nonnegative low rank matrix factors, and s is a closed form solution; and controlling one or more actuators using live data and the learned module during operation.

2. The method of claim 1, wherein the partitioning comprises selecting using one of random, rank-one singular value decomposition (SVD), and rank-one ADMM.

3. The method of claim 1, comprising solving computation complexity as linearly proportional to a matrix rank.

4. The method of claim 1, wherein for each submatrix X(i) with i as an index of submatrices, using rank-one ADMM to optimize NMFC over a node.

5. The method of claim 1, comprising uniformly selecting a number of samples for a node.

6. The method of claim 1, comprising performing singular value decomposition by projecting an eigenvector over a nonnegative set, and then conducting k-means clustering over the eigenvector.

7. The method of claim 1, comprising performing ADMM for NMFC by conducting k-means clustering over an eigenvector.

8. The method of claim 1, comprising providing a warm start for a second rank optimization.

9. The method of claim 1, wherein for rank-one ADMM, comprising performing a greedy search for rank-one solutions based upon ADMM.

10. The method of claim 1, comprising performing SVD by projecting an eigenvector over a nonnegative set, and then conducting k-means clustering over the eigenvector.

11. The method of claim 1, comprising performing ADMM for Nonnegative matrix factorization/completion (NMFC) by conducting k-means clustering over an eigenvector.

12. The method of claim 1, comprising providing a warm start for a second rank optimization.

13. The method of claim 1, wherein for rank-one ADMM, comprising performing a greedy search for rank-one solutions based upon ADMM.

14. A method for operating a machine, comprising
receiving training data from one or more sensors;
training a machine learning module with the training data by:
    partitioning a data matrix into smaller submatrices to process in parallel for each processing node;
    for each submatrix, performing a greedy search for rank-one solutions;
    using alternating direction method of multipliers (ADMM) to ensure consistency over different data blocks;
    determining:

$$\begin{cases} u(i)_k \leftarrow \dfrac{\left[\hat{X}(i)(v(i)^k)^T + \rho a(i)_k - p\right]}{[v(i)^k(v(i)^k)^T + \rho]} \\ v(i)^k \leftarrow \dfrac{\left[u(i)_k^T \hat{X}(i) + \rho b(i)^k + \sum_{j \neq i} \rho v(j)^k - q - (c-1)s\right]}{[(u(i)_k)^T u(i)_k + \rho]} \\ a(i)_k \leftarrow P_+(u(i)_k + p/\rho) \\ b(i)^k \leftarrow P_+(v(i)^k + q/\rho) \\ p \leftarrow p + \rho(u(i)_k - a(i)_k) \\ q \leftarrow q + \rho(v(i)^k - b(i)^k) \\ s \leftarrow s + \dfrac{\rho}{c-1} \sum_{j \neq i}(v(i)^k - v(j)^k) \end{cases}$$

where X is a partially observed data matrix of n samples and d features; i, j, k are indices, a and b are auxiliary variables, c is a constant, p, q, and T are Lagrangian multipliers, ρ is a penalty operator, and U and V are nonnegative low rank matrix factors, and s is a closed form solution; and controlling one or more actuators using live data and the learning module during operation.

15. The method of claim 14, comprising partitioning the data matrix into smaller submatrices using one of: random, rank-one SVD, and rank-one ADMM technique.

16. The method of claim 14, wherein for each submatrix X(i) with i as an index of submatrices, using rank-one ADMM to optimize Nonnegative matrix factorization/completion (NMFC) over a node.

17. The method of claim 14, comprising uniformly selecting a number of samples for a node.

\* \* \* \* \*